J. W. Stout,
Mower.
No. 35479.  Patented June 3, 1862.

Witnesses  Inventor.
Jacob W. Stout
per Munn & Co.
Attorneys

UNITED STATES PATENT OFFICE.

JACOB W. STOUT, OF RARITAN, NEW JERSEY.

IMPROVEMENT IN HARVESTERS.

Specification forming part of Letters Patent No. 35,479, dated June 3, 1862.

*To all whom it may concern:*

Be it known that I, JACOB W. STOUT, of Raritan, in the county of Somerset and State of New Jersey, have invented a new and Improved Reaping and Mowing Machine; and I do hereby declare that the following is a full, clear, and exact description of the same, reference being had to the accompanying drawings, making a part of this specification, in which—

Figure 1:
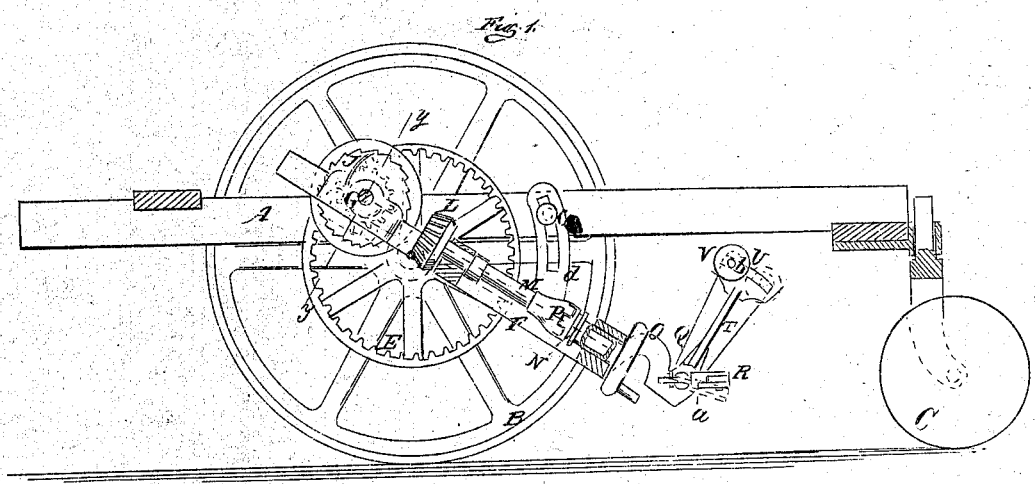
Figure 2:
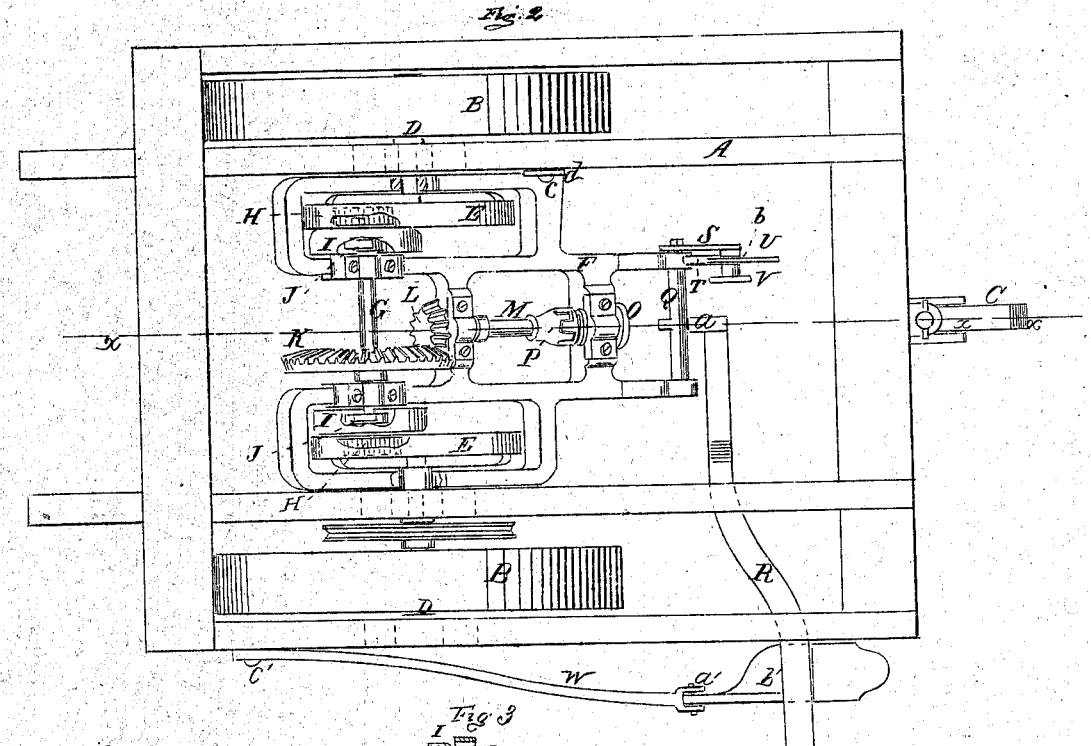
Figure 3:
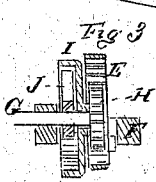

Figure 1 is a side sectional view of my invention, taken in the line $x\,x$, Fig. 2; Fig. 2, a plan or top view of the same; Fig. 3, a section of a portion of the same, taken in the line $y\,y$, Fig. 1.

Similar letters of reference indicate corresponding parts in the several figures.

This invention relates to an improvement in that class of reaping and mowing machines which have their sickles and driving-gear attached to a frame which is allowed to swing on the axle of the wheels on which the main frame is mounted.

To enable those skilled in the art to fully understand and construct my invention, I will proceed to describe it.

A represents the main frame of the machine, which is supported at its front ends by two wheels, B B, and a caster-wheel, C, at its back part. The wheels B B are placed on separate or independent axles D D, to the inner ends of which toothed wheels E E are attached, one to each. These wheels E E have their teeth at the inner side of their peripheries, as shown clearly in Fig. 1, and on the axles D D of the wheels a frame, F, is hung and allowed to swing loosely, said frame being hung on the axles D at the outer sides of the wheels E E, as shown clearly in Fig. 2.

In the front part of the frame F there is placed transversely a shaft, G, which has a pinion, H, placed loosely on each end of it. These pinions gear into the wheels E E, and to each pinion there is attached a ratchet, I, the teeth of which are at the inner sides of their peripheries, and catch, when the machine is drawn forward, into pawls J J, which are attached to the shaft G, and cause the latter to rotate. In backing the machine the teeth of the ratchet slip over the pawls J J, and the shaft G consequently remains stationary.

On the shaft G there is placed a bevel-wheel, K, which gears into a bevel-pinion, L, on the front end of a shaft, M, which is placed longitudinally in the frame F, and has a sleeve, N, upon it, which is provided with a crank-wheel, O, at its lower end, from which the sickle is driven by a connecting-rod. The sleeve N is fitted loosely on the shaft M, and is connected therewith by a clutch, P.

In the back end of the frame F there is placed transversely a shaft, Q, to which the finger-bar R is connected by a short arm, $a$. The shaft Q is allowed to turn in the frame F, and to one end of it there is secured a bar, S, which extends upward by the side of a rod, T, having a sector-guide, U, at its upper end, through which a pin, $b$, on the upper end of the bar S passes, said pin having a screw-thread cut on it to receive a thumb-nut, V, by which the bar S may be firmly secured to the guide U, and the shaft Q held in proper position or prevented from turning in the frame F. By adjusting the shaft Q the finger-bar R may be secured in a more or less inclined position, and the teeth of the sickle be more or less elevated at their front ends, as the nature of the ground may require. If the ground be rough and stony, the front ends of the teeth should be elevated as much as possible, in order that they may clear and pass over the obstructions freely. If the ground be smooth, they may be depressed at their front ends, so as to cut close. This adjustment of the finger-bar will be understood by referring to Fig. 1.

The finger-bar and sickle may be adjusted bodily at a greater or less elevation from the surface of the ground by means of a set-screw, $c$, which passes through a sector-arm, $d$, at one side of the frame F, and into the main frame A.

In consequence of having the frame F hung on the axles D D of the wheels B B, and arranged as shown, a very simple and direct driving mechanism is obtained, and one not at all affected by the adjustment of the frame F, and which admits of the machine being "backed" without operating the sickle, and at the same time causes an equal strain at both sides of the machine, which insures an easy-running movement of the sickle-driving mechanism.

I would remark that the finger-bar R has a brace, W, connected to it. This brace is connected by a pivot, $a'$, to the front end of the inner shoe, $b'$, of the finger-bar. The front end of the brace being attached by a pivot, $c'$, to the main frame A; and I would further remark that the short arm $a$, which connects the finger-bar R with the shaft Q, is allowed to turn freely in the latter, in order to admit of the finger-bar and sickle conforming to the inequalities of surface over which they pass.

The motion of the sickle may be stopped at any time by disconnecting the sleeve N from the shaft M.

Having thus described my invention, what I claim as new, and desire to secure by Letters Patent, is—

The combination and arrangement of the frame F on the axles D D, of the wheels B B with the gearing E E H H, ratchets I I, pawls J J, and the bevel-gears K L, substantially as and for the purpose herein set forth.

JACOB W. STOUT.

Witnesses:
FRED. J. FRELINGHUYSEN,
JOHN D. WYCKOFF.